(12) United States Patent
Tian

(10) Patent No.: US 10,322,790 B2
(45) Date of Patent: Jun. 18, 2019

(54) TAIL TRACKING ANTENNA

(71) Applicant: Pinnacle Vista, LLC, Upland, CA (US)

(72) Inventor: Yu Tian, Hong Kong (HK)

(73) Assignee: Pinnacle Vista, LLC, Upland, CA (US)

(*) Notice: Subject to any disclaimer, the term of this patent is extended or adjusted under 35 U.S.C. 154(b) by 0 days.

(21) Appl. No.: 15/857,983

(22) Filed: Dec. 29, 2017

(65) Prior Publication Data

US 2019/0054997 A1 Feb. 21, 2019

Related U.S. Application Data

(62) Division of application No. 15/682,542, filed on Aug. 21, 2017, now abandoned.

(51) Int. Cl.

| | |
|---|---|
| *H01Q 1/28* | (2006.01) |
| *B64C 1/36* | (2006.01) |
| *H01Q 1/36* | (2006.01) |
| *H01Q 3/06* | (2006.01) |
| *B64C 39/02* | (2006.01) |
| *H01Q 1/18* | (2006.01) |
| *H01Q 1/42* | (2006.01) |

(52) U.S. Cl.
CPC .............. *B64C 1/36* (2013.01); *B64C 39/024* (2013.01); *H01Q 1/18* (2013.01); *H01Q 1/185* (2013.01); *H01Q 1/282* (2013.01); *H01Q 1/36* (2013.01); *H01Q 3/06* (2013.01); *B64C 2201/146* (2013.01); *H01Q 1/42* (2013.01)

(58) Field of Classification Search
CPC .......... H01Q 1/28; H01Q 1/282; H01Q 1/283; H01Q 1/286; H01Q 1/287; H01Q 1/185; H01Q 3/06; H01Q 1/42
See application file for complete search history.

(56) References Cited

U.S. PATENT DOCUMENTS 9,545,991 B1 * 1/2017 Alley .................... B64C 3/40

FOREIGN PATENT DOCUMENTS

EP 3159964 A1 * 4/2017 ............ B64D 47/08

OTHER PUBLICATIONS

Derwent 2017-2014161, Chon et al.*

* cited by examiner

*Primary Examiner* — Hoang V Nguyen
(74) *Attorney, Agent, or Firm* — WPAT, P.C., INTELLECTUAL PROPERTY ATTORNEYS; Anthony King

(57) ABSTRACT

An unmanned aerial vehicle (UAV) and a system of communication between an unmanned aerial vehicle with a ground controller, the UAV having a top side, a bottom side, and an antenna side. The antenna side of the UAV can have a hinge to which a flat panel antenna can be disposed is pivotably coupled. The flat panel antenna can be actively controlled or passively controlled by gravity.

16 Claims, 9 Drawing Sheets

TAIL TRACKING ANTENNA

CROSS-REFERENCE TO RELATED APPLICATIONS

This application claims the benefit of prior-filed application Ser. No. 15/682,542, filed Aug. 21, 2017, under 35 U.S.C. 120.

FIELD OF THE DISCLOSURE

The field of the disclosure is unmanned aerial vehicle (UAV) in general and UAV communication devices specifically.

BACKGROUND

UAVs, or UAVs (unmanned aerial vehicles), are typically controlled by either a hand-held remote controller, or some kind of ground communication device. UAVs are also known to communicate via antennae. Various types of antennae are known; some are for data transmission, some are for video data transmission, some are for GPS positioning.

There is a continuously need to improve communication in UAVs. There is also a continuing need to increase the range of communication by an antenna of a UAV. One known solution is to use bigger and bigger antennae, or by adding bigger and bigger boosters for the hand-held remote controller.

All referenced patents, applications and literatures are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply. The embodiment may seek to satisfy one or more of the above-mentioned desires. Although the present embodiment may obviate one or more of the above-mentioned desires, it should be understood that some aspects of the embodiment might not necessarily obviate them.

SUMMARY OF THE DISCLOSURE

A contemplated unmanned aerial vehicle (UAV) having a pivotable flat panel antenna is herein disclosed. In one embodiment, the UAV has a hinge disposed on the outside of the UAV, and can coupled to the flat panel antenna.

Also contemplated is a housing to enclose the pivotable flat panel antenna. The housing can be disposed on the outside of the UAV.

Contemplated flat panel antenna can be disposed within the housing and is pivotably coupled to the hinge to change a pitch of the flat panel antenna.

In some embodiments, the flat panel antenna can be actively controlled. In some embodiments, an actuator is used to actively control the pitch the flat panel antenna. In other embodiments, the actuator can be a servo motor, a gimbal, a pneumatic motor, a hydraulic motor.

In some other embodiments, the flat panel antenna is freely pivotably, freely coupled to the hinge, and is actuated by a force of gravity.

In one aspect of the embodiments, there can be a gap that is sufficiently spaced between the flat panel antenna and the housing to create an air resistance to dampen a free pivoting movement of the flat panel antenna when the flat panel antenna is acted on by a force of gravity. In other embodiments, the size of the gap remains consistent as the panel antenna freely and hysteretically pivots by said force of gravity.

Contemplated housing in one aspect of the embodiment has a bottom wall, and the bottom wall can have an arcuate shape.

In yet another embodiment, the housing is airtight.

The housing can have many shapes and sizes. In one embodiment, the housing can have a first wall coupled to the hinge, and the first wall can be arranged to stop the flat antenna on the first wall when the unmanned aerial vehicle tilts more than a first angle, wherein the first angle is at most 120 degrees to a vertical axis perpendicular to the hinge.

Optionally, there can be a second wall coupled to the hinge, the second wall can be arranged to stop the flat antenna on the second wall when the unmanned aerial vehicle tilts more than a second angle, wherein the second angle is at most 120 degrees to a vertical axis perpendicular to the hinge.

Other aspects of the disclosed embodiments include a communication system, the contemplated system includes a UAV having a top side, bottom side, and an antenna side, and a ground controller configured to send a command, and a positional information of the ground controller to the UAV causing the UAV to constantly remain facing the ground controller with the antenna side, regardless of a relative orientation of the UAV to the ground controller.

In the contemplated embodiments, the antenna side of the UAV can have an antenna device including a hinge coupled to the unmanned aerial vehicle, and a flat panel antenna pivotably coupled on the hinge.

As discussed above, there can be an optional housing to enclose the flat panel antenna, and the flat panel antenna pivots relative to the housing. The housing can be used to eliminate force of wind acting on the flat panel antenna.

As discussed above, the flat panel antenna in the antenna device can freely pivot and can be coupled to the hinge. The flat panel antenna in such embodiments can be actuated solely by a force of gravity.

Various objects, features, aspects and advantages of the present embodiment will become more apparent from the following detailed description of embodiments of the embodiment, along with the accompanying drawings in which like numerals represent like components.

BRIEF DESCRIPTION OF THE DRAWINGS

It should be noted that the drawing figures may be in simplified form and might not be to precise scale. In reference to the disclosure herein, for purposes of convenience and clarity only, directional terms such as top, bottom, left, right, up, down, over, above, below, beneath, rear, front, distal, and proximal are used with respect to the accompanying drawings. Such directional terms should not be construed to limit the scope of the embodiment in any manner.

DETAILED DESCRIPTION

Figure 1:
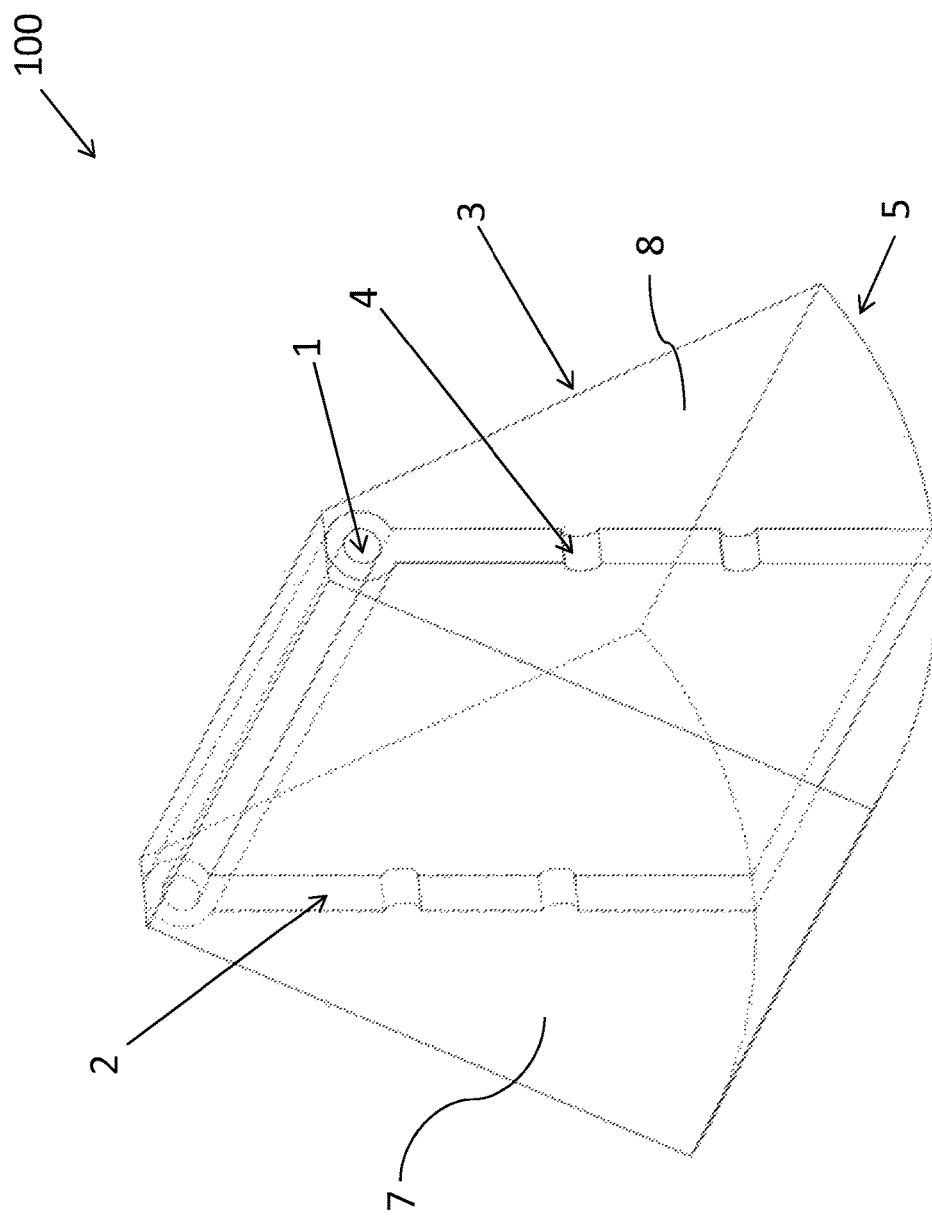
FIG. 1 is a perspective transparent view of an embodiment of the antenna device, according to an aspect of the embodiment.

One aspect of the current disclosure is an apparatus to improve communication and/or to increase the range of communication between a UAV and a transceiver on the ground/over water (be it a hand-held controller or some other device), without having to use a bigger antenna, or without having to add a booster.

Prior art UAVs can have many types of antennae (e.g., omnidirectional antenna, directional antenna, flat panel antenna) installed somewhere on the UAV.

Known flat panel antennae are fixedly attached to the outside of a UAV, usually on the side of a UAV. The prior art flat panel antenna is fixed and does not move relative to the body of the UAV.

The inventor has discovered a novel method of substantially increasing the distance and coverage of UAV antenna communication without changing the type/size/strength of the flat panel antenna.

As mentioned above, prior art solution included using bigger antenna and/or adding signal booster to a ground controller. Such prior art solution of using boosters and bigger antennae makes hand-held controllers undesirably bulky and heavy.

Also, aftermarket bigger antenna and boosters are costly to the end consumer, therefore undesirable. For the manufacturer, building UAVs using bigger antenna can be costly, and can undesirably make the UAV heavier, thereby negatively affective flight time and energy consumption.

Therefore, the current disclosure also provides a low-cost solution to improve and/or increase the range of communication for a flat panel antenna on a UAV.

The embodiment and its various embodiments can now be better understood by turning to the following detailed description of the embodiments, which are presented as illustrated examples of the embodiment defined in the claims. It is expressly understood that the embodiment as defined by the claims may be broader than the illustrated embodiments described below.

Many alterations and modifications may be made by those having ordinary skill in the art without departing from the spirit and scope of the embodiment. Therefore, it must be understood that the illustrated embodiment has been set forth only for the purposes of example and that it should not be taken as limiting the embodiment as defined by the following claims. For example, notwithstanding the fact that the elements of a claim are set forth below in a certain combination, it must be expressly understood that the embodiment includes other combinations of fewer, more or different elements, which are disclosed herein even when not initially claimed in such combinations.

The words used in this specification to describe the embodiment and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims therefore include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

As used herein, the term "housing" in conjunction with the flat panel antenna refers to an outer casing or covering. It may or may not have perforations unless specifically described as so below. For example, a housing can be an open frame having through openings. A housing can also be closed-off such that a consumer cannot easily access components within the housing without disassembling the housing.

In FIG. 1, one aspect of the invention, an antenna device 100 has a flat panel antenna 2 pivotably coupled to an optional housing 3. In one aspect of the disclosure which will be described in more details later, the flat panel antenna 2 freely hangs straight downward when the gravity acts on it.

In another aspect of the disclosure which will be described in more details later, the flat panel antenna 2 is not actively controlled and is solely controlled passively by gravity, and the range or speed of its pivoting movement can be limited by mechanic stoppers, walls, and air resistance.

In another aspect of the disclosure which will be described in more details later, the flat panel antenna 2 is actively controlled such that the flat panel antenna does not freely hang when the force of gravity act on it.

Whether the flat panel antenna 2 is actively controlled or passively controlled by the force of gravity, the flat panel antenna 2 is configured to transmit data with a ground controller, or with any other communication point such as another UAV.

Any known size, type, shape, and strength of flat panel antenna 2 are contemplated. In the embodiments shown, a square flat panel antenna 2 is used. In one embodiment, the Panel antenna can be one that has a 10 db gain.

Contemplated flat panel antenna 2 can be coupled to a hinge 1. The hinge can be disposed on the outside of the UAV, or within the optional housing 3. The hinge allows the flat panel antenna 2 to move in a pivoting range of motion within the optional housing 3.

Figure 8:
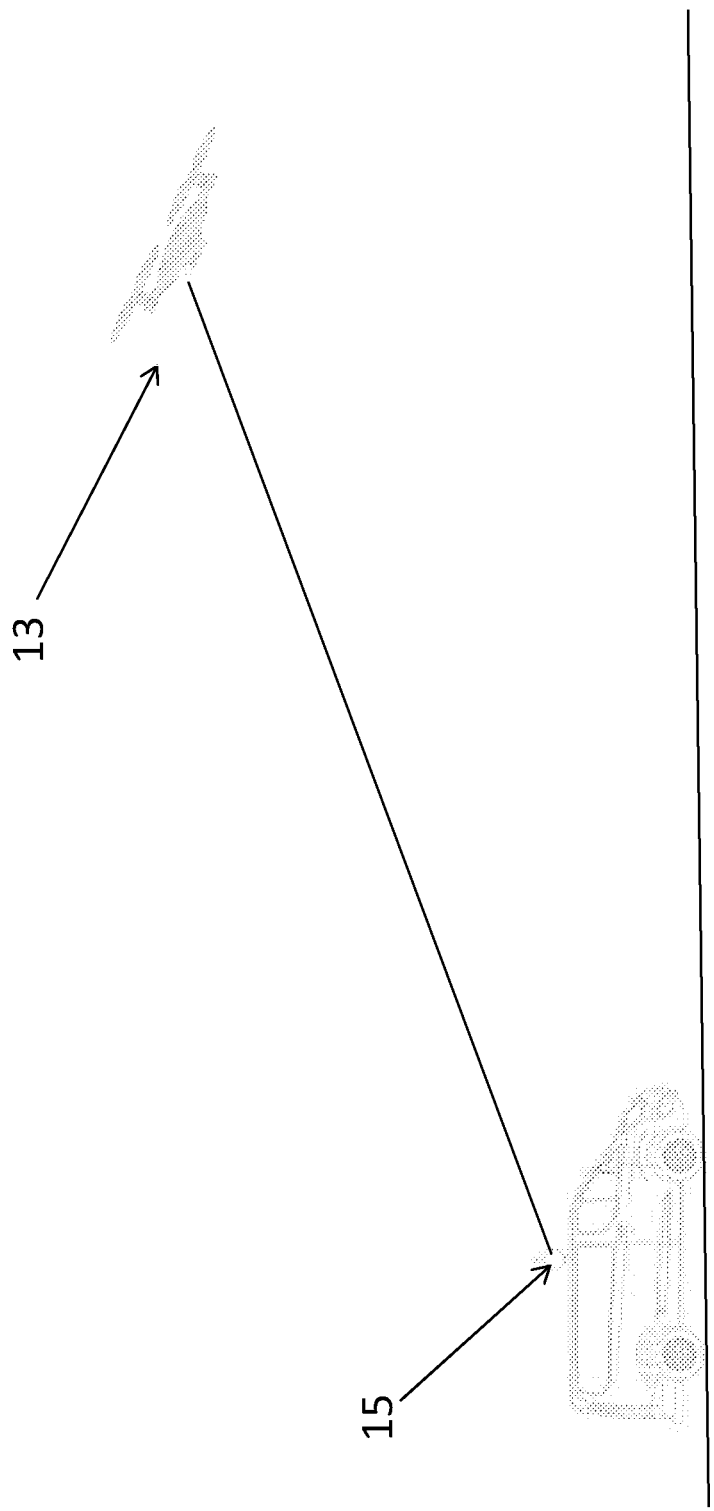
FIG. 8 is an illustration of a forward moving UAV and a car in motion, communicating with each other.

The pivoting range of motion allows the flat panel antenna 2 to change a pitch, so that the flat panel antenna 2 can more appropriately face the ground controller 15 (see FIG. 8). In FIG. 8, the UAV 13 and the car are both moving forward as the same speed. The pitch of the flat panel antenna is automatically adjusted (as will be discussed in more detail later) to maintain good communication with the ground controller 15 on the car.

FIG. 1 depicts a housing 3 to enclose the flat panel antenna 2 and the hinge 1.

It should be particularly noted that some embodiments does not require the use of a housing 3. In particular, embodiments where flat panel antenna 2 is actively controlled may have no housing 3. The housing 3 can eliminate the effect of wind acting on the flat panel antenna as the UAV travels. Also, the housing 3 can protect the flat panel antenna 2 from elements (weather, sand, dust, etc.). The housing 3 can also protect the integrity of the antenna 2 from physical damage (e.g., when the UAV drops from the sky).

In most embodiments, the housing 3 can be disposed on the outside of the UAV. It can be positioned on the side of a UAV, or a bottom of a UAV.

There can be a first and second walls 7, 8 coupled to the hinge. The first wall 7 can be arranged to stop the flat antenna from further pivoting when the unmanned aerial vehicle tilts more than a predefined angle during flight. In one contemplated embodiment, this angle is at most 65 degrees to a vertical axis perpendicular to the hinge; in another contemplated embodiment, this angle is at most 55 degrees to a vertical axis perpendicular to the hinge; in yet another contemplated embodiment, this angle is at most 45 degrees to a vertical axis perpendicular to the hinge; in still another contemplated embodiment, this angle is at most 35 degrees to a vertical axis perpendicular to the hinge; in a further contemplated embodiment, this angle is at most 25 degrees to a vertical axis perpendicular to the hinge; in yet further contemplated embodiments, this angle is at most 15 degrees to a vertical axis perpendicular to the hinge.

Likewise, the contemplated second wall 8 can be arranged to stop the flat antenna from further pivoting when the unmanned aerial vehicle tilts more than a predefined angle during flight. In one contemplated embodiment, this angle is at most negative 65 degrees to a vertical axis perpendicular to the hinge; in another contemplated embodiment, this angle is at most −55 degrees to a vertical axis perpendicular to the hinge; in yet another contemplated embodiment, this angle is at most −45 degrees to a vertical axis perpendicular to the hinge; in still another contemplated embodiment, this angle is at most −35 degrees to a vertical axis perpendicular to the hinge; in a further contemplated embodiment, this angle is at most −25 degrees to a vertical axis perpendicular to the hinge; in yet further contemplated embodiments, this angle is at most −15 degrees to a vertical axis perpendicular to the hinge.

Different aspects of the housing 3 that the disclosure addresses include having an optional airtight housing such that no air escapes from the interior of the housing 3.

Contemplated housing in one aspect of the embodiment has a bottom wall 5 adjacent to the first wall 7 on one end, and adjacent to the second wall 8 on the opposite end. Referring now to FIGS. 1-7, the bottom wall 5 can have an arcuate shape. In other embodiments, the inside surface of the bottom wall 5 can have an arcuate shape, no matter what exterior shape the bottom wall may have. By having an arcuate shape, the inside surface of the bottom wall 5 remains equidistant to the distal ledge of the flat panel antenna 2 along its entire pivoting range of movement. In one example, when the flat panel antenna 2 swings to the far left, the distance between the distal ledge to the closest part of the inside surface of the bottom wall 5 is X. When the flat panel antenna 2 swings to the far right, the distance between the distal ledge to the closest part of the inside surface of the bottom wall 5 is still X. In this particular embodiment, the distance between the distal ledge to the closest part of the inside surface of the bottom wall 5 is always X no matter the degree of the flat panel antenna's tilt angle relative to the housing 3.

While housing 3 is shown to have a pie-shape, the housing can have various exterior shapes as well. In some embodiments, the exterior shape of the housing 3 is aerodynamic and/or low-profile.

Figure 2:
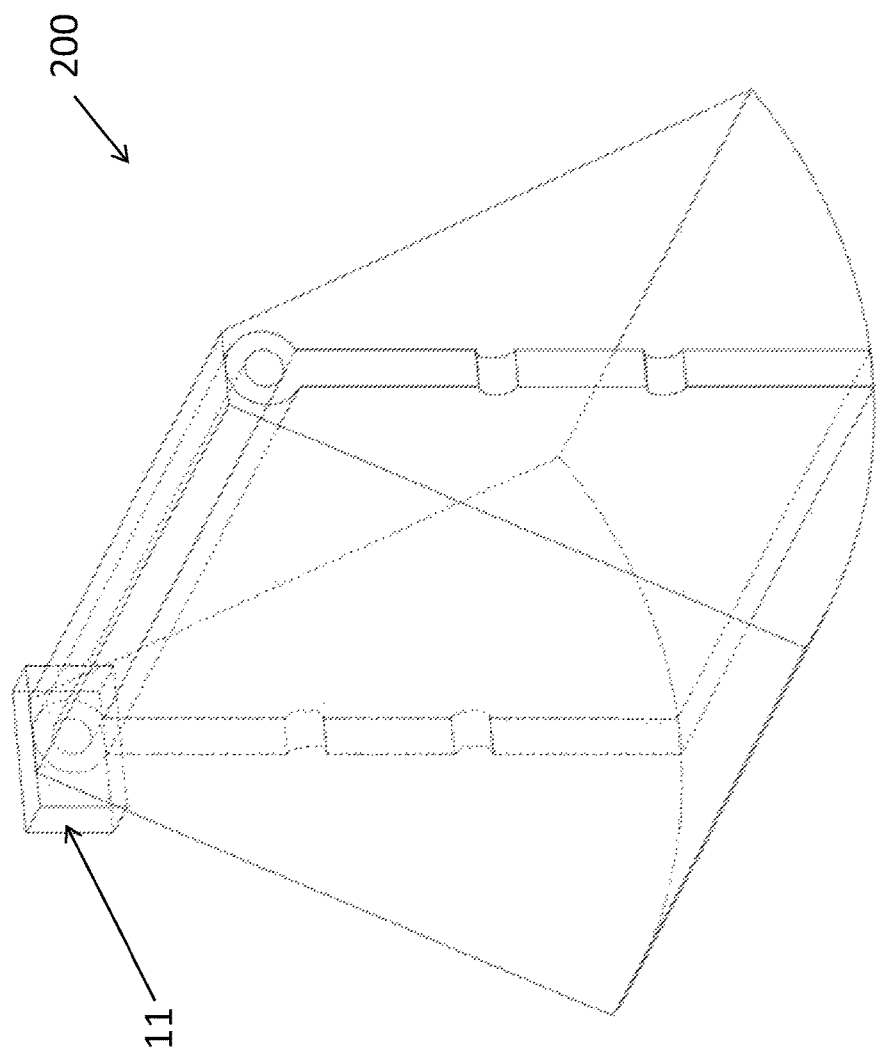
FIG. 2 is a perspective transparent view of another embodiment of the antenna device, according to an aspect of the embodiment.

Referring now to FIG. 2, in some embodiments, the flat panel antenna 2 can be actively controlled. In other embodiments, an actuator 11 is used to actively control the pitch/pivoting movement of the flat panel antenna 2. In other embodiments, the actuator 11 can be a servo motor, a gimbal (one-axis), a pneumatic motor, a hydraulic motor.

In other embodiments, tilting/movement/swing of the panel antenna 2 can be actively controlled using some kind of control arms, 1-axis gimbal, 2-axis gimbal, or 3-axis gimbal. By using a gimbal, the panel antenna 2 can be actively controlled and moved so that the panel antenna 2 is always pointed toward the ground controller.

In yet another embodiment, using a 1-axis gimbal is preferred because it costs less than a 2-axis or 3-axis gimbal. This 1-axis gimbal would be responsible to adjusting the pitch angle only. As will be described later, the changes in yaw can be effectuated by the UAV automatically adjusting its position so that its antenna side remains facing the ground controller even as the relative position of the UAV and the ground controller changes (see FIG. 9).

Figure 3:
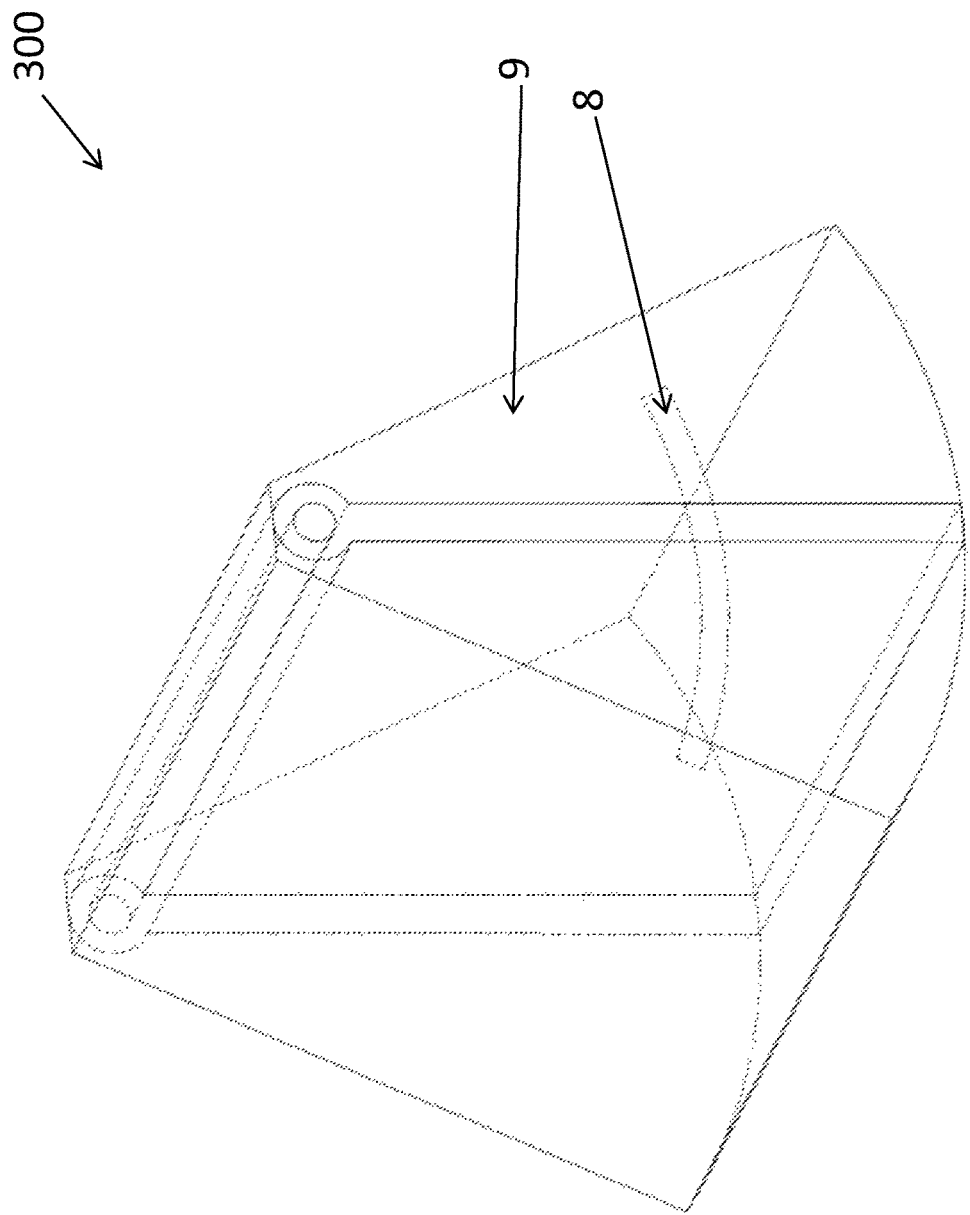
FIG. 3 is a perspective transparent view of yet another embodiment of the antenna device, according to an aspect of the embodiment.
Figure 4:
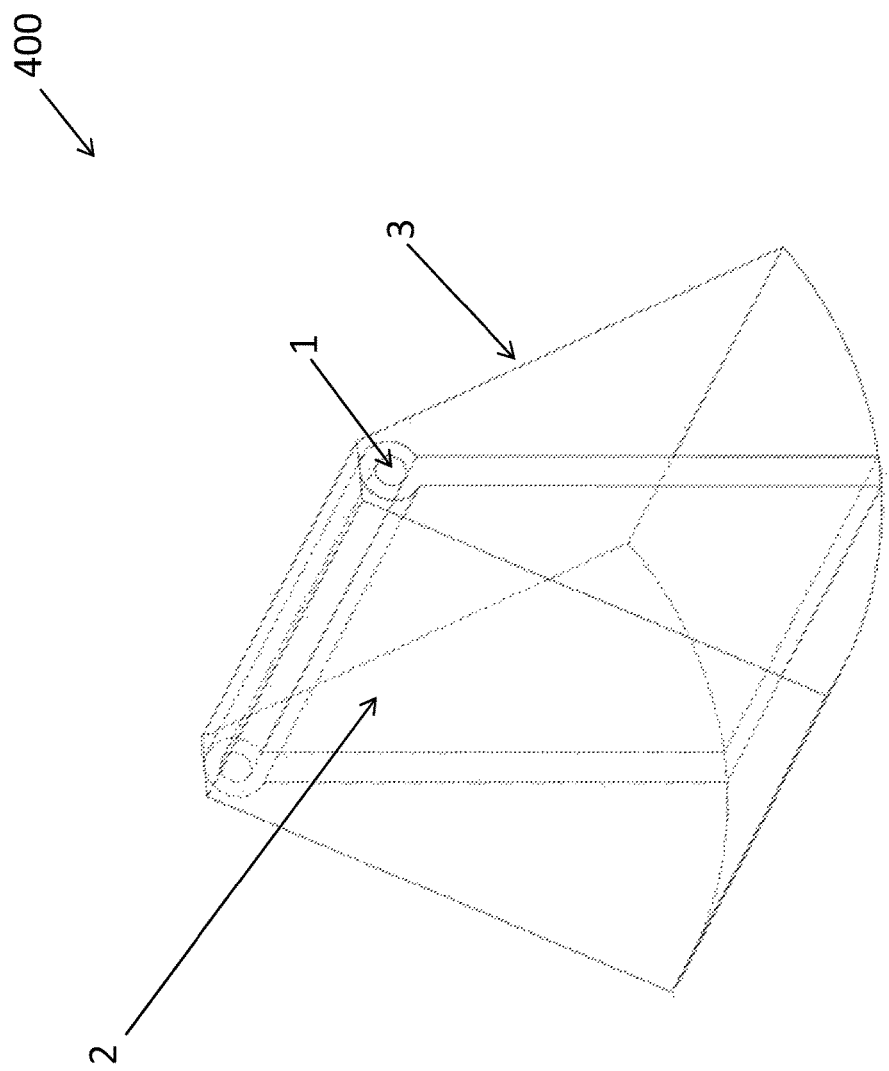
FIG. 4 is a perspective transparent view of a further embodiment of the antenna device, according to an aspect of the embodiment.

In further embodiments, the flat panel antenna 2 can be passively controlled without any active control. That is, there is no active control to move the flat panel antenna 2 against the force of gravity. As shown in FIGS. 1, 3, and 4, the flat panel antenna 2 freely hung downward at rest.

As disclosed above, first wall 7 and second wall 8 can act as stoppers, stopping the flat panel antenna 2 from further swing. It is also contemplated to have mechanical stoppers (not shown), such as protuberances on the inside wall surfaces of the housing 3 as appropriate spots to stop the flat panel antenna 2 from further swing.

While the flat panel antenna 2 can be freely hung from the hinge 1 (see FIG. 5), some embodiments provide additional mechanism to dampen the pivoting movement. In other words, there can be additional structural mechanism to delay the pivoting movement of the flat panel antenna (i.e., slowing the pivoting movement).

Figure 7:
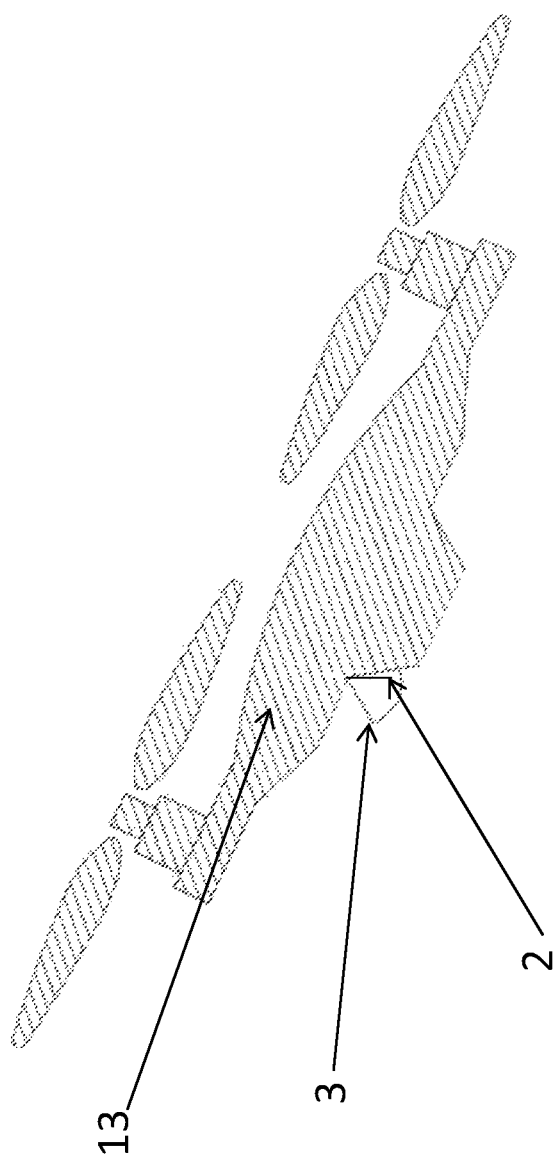
FIG. 7 is a side illustrative view of a UAV having a contemplated antenna device when the UAV is moving forward, hence tilting forward, and allowing the flat panel antenna to hang down by the force of gravity.

In operation, when a multi-copter UAV 13 move forward or background in flight, the UAV naturally tilts at an angle (see FIG. 7, as the UAV 13 moves towards the right of the Figure). As such, when the UAV 13 tilt forward, the panel antenna would also tilt forward, and hangs vertically due to the force of gravity and remains relatively vertical. Without the panel antenna being freely pivotable, the panel antenna would undesirably point towards the sky instead. As a result, the UAV 13 remains in good communication with the ground controllers 15.

Figure 6:
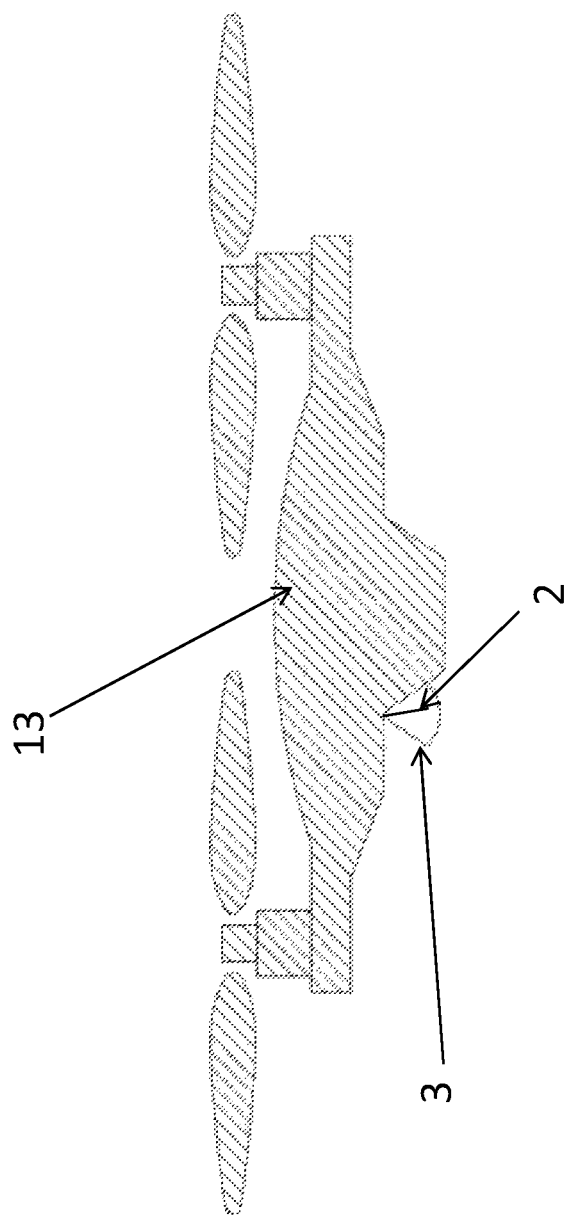
FIG. 6 is a side illustrative view of another UAV having a contemplated antenna device when the UAV is in leveled flight, and wherein the flat panel antenna stayed in a tilted position.

In one embodiment, the panel antenna 2 is designed to tilt at 5 degrees at rest (as shown in FIG. 6). This can be done by various methods. For example, using some kind of mechanical stopper or springs to keep it in a desired angle relative to the center of gravity.

In one embodiment, there can be a gap 4 that is sufficiently spaced between the flat panel antenna 2 and the inside surface of the housing 3 to create an air resistance to dampen a free pivoting movement of the flat panel antenna when the flat panel antenna is acted on by a force of gravity. In other embodiments, the gap is defined as the space between the entire periphery of the flat panel antenna 2 and the inside surface of the housing 3. In some embodiments, the size of the gap 4 remains consistent as the panel antenna freely and hysteretically pivots by said force of gravity within the housing 2.

In another embodiment, the gap 3 can include a vent, or perforation either on the flat panel antenna 2, or on the peripheral edges of the antenna.

In the embodiment of FIG. 3, the housing 3 can have an opening 8 on a side wall 9 to the atmosphere. The opening 8 is sized and positioned such that the free swing of the panel antenna 2 is slowed because only a small amount of gas is allowed to escape through the opening 8.

In the embodiment of FIG. 4, the housing 3 can be air-tight, and the panel antenna 2 is fittingly disposed in the housing such that a small amount of gas escapes around the edges of the panel antenna. In other embodiments, there can be provided air vents anywhere, such as around the edges of the panel antenna, so that the slow gas exchange between the chambers on either side of the panel antenna makes the "pivoting" action slow.

The "slow" pivoting action is preferred in some embodiments because sometimes a UAV might unintentionally move erratically during flight, and a "slowed" pivoting action would prevent the panel antenna 2 from also swinging erratically.

While the disclosed embodiment shows using gaps or sufficiently spaced air seals to gauge gas exchange as a way to slow the swing, there can be various other ways to achieve the same result. For example, the pivoting joint can use some kind of pneumatic pivoting joint so that the swinging action is slowed.

Other aspects of the disclosed embodiments include a communication system, where the contemplated system includes a UAV 13 having a top side, bottom side, and an antenna side. The system also includes a ground controller 15 configured to send a command, and a positional information of the ground controller to the UAV 13 causing the UAV 13 to constantly remain facing the ground controller with the antenna side, regardless of a relative orientation of the UAV to the ground controller. One example of the positional information is a GPS coordinate.

Figure 9:
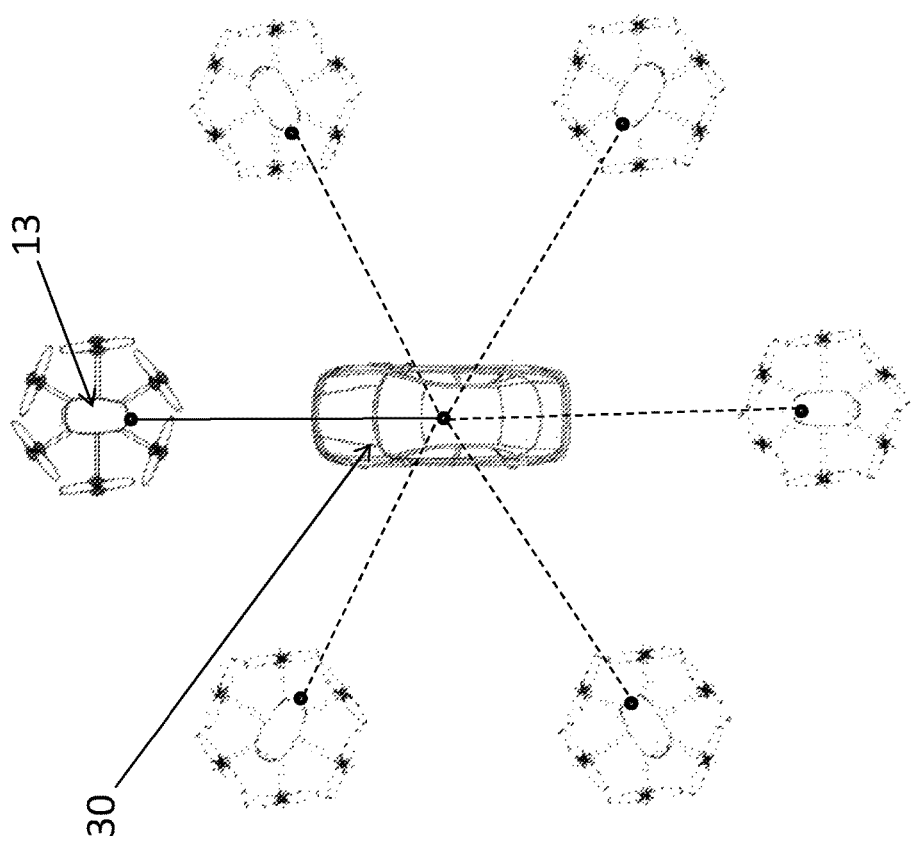
FIG. 9 illustrates a system where an antenna side of the UAV remains facing the ground controller no matter when the UAV is relative to the ground controller.

The antenna side is defined as the side the contemplated pivotable flat panel antenna 2 is located accordingly to the many aspects of the instant disclosure. In FIG. 9, the dot on each of the six multi-copter UAVs 13 represents the location of the pivotable flat panel antenna 2 on each UAV 13.

The command can be any automatic or user-directed command in the form of an electronic control signal to control any aspect of the UAV 13. The control signal can include flight control.

In operation, the contemplated embodiments of pivotable flat panel antenna 2 provide an economic solution because no complicated mechanism is required to change the pitch and yaw of the pivotable flat panel antenna 2. Pitch of the pivotable flat panel antenna 2 is adjusted by gravity as discussed above, and yaw is adjusted by the UAV 13 deliberately facing its antenna side (the dot in FIG. 9) no matter what direction the UAV 13 is traveling towards.

FIG. 9 shows one UAV 13 (in solid line) circling around the ground controller in a car 30. The five other UAVs in broken lines represent the various positions of the UAV 13 as it encircles the car 30.

Figure 5:
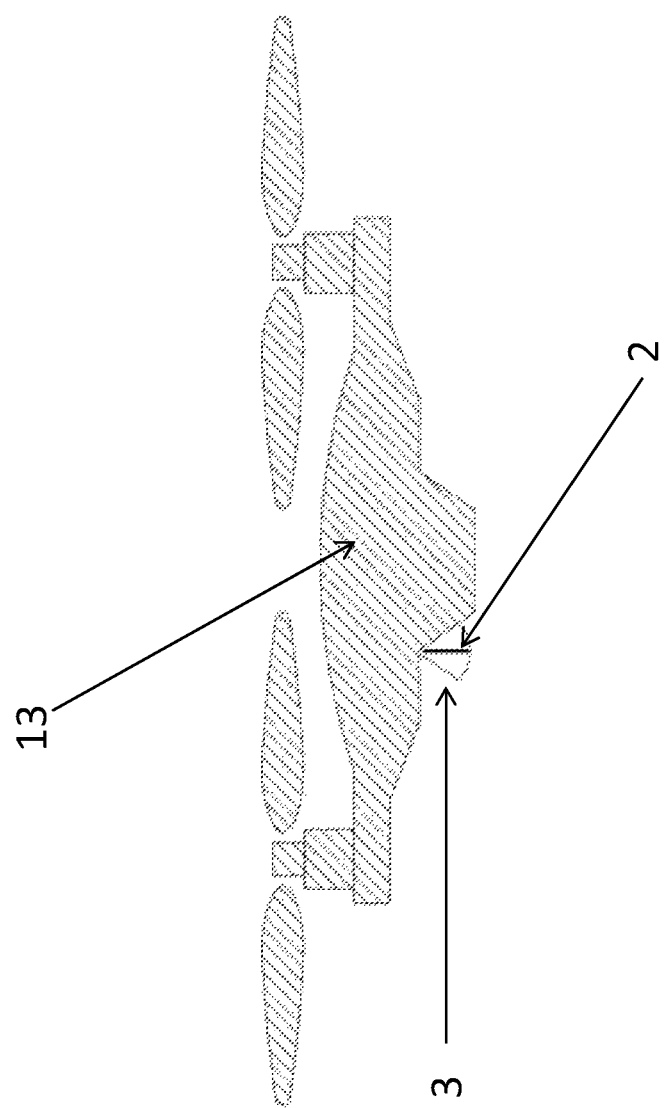
FIG. 5 is a side illustrative view of a UAV having a contemplated antenna device when the UAV is in leveled flight.

In one scenario, assuming the car and the UAV 13 are idling and not traveling in any direction, and the UAV is at the 12'o clock position. As UAV is in leveled flight and not tilting, its flat panel antenna 2 would remain in a predetermined pitch angle Y. In some embodiments as discussed above, this predetermined pitch angle is zero (as shown in FIG. 5) relative to a vertical axis perpendicular to the ground. In other embodiments as discussed above, this predetermined pitch angle can be 5 degrees (as shown in FIG. 6) relative to a vertical axis perpendicular to the ground.

Assuming now the car 30 travels along with the UAV 13, and the UAV is at the 12'o clock position. As UAV travels forward, the UAV tilts forward such as that shown in FIGS. 7 and 8. Although the UAV remains tilted forward, the flat panel antenna 2 would remain in the same pitch angle Y as if the UAV were in leveled flight. In this way, the reception and communication between the UAV 13 and the ground controller remains relatively unchanged even as the UAV is tilted during travel.

Assuming now the UAV 13 is specifically directed by a user in the car 30 to "follow" the car 30 as the car 30 travels forward. The UAV is now at the 6'o clock position. Note that the UAV would have its antenna side (the dot) face the car 30 even as both the car 30 and the UAV travel in the same direction. This means the UAV is essentially flying backwards if the antenna side is considered the backside of the UAV. As UAV 13 travels backwards in this scenario, the UAV 13 tilts backward. Although the UAV remains tilted backward, the flat panel antenna 2 would remain in the same pitch angle Y as if the UAV were in leveled flight. Again, the reception and communication between the UAV 13 and the ground controller remains relatively unchanged even as the UAV is tilted backward during flight.

Although the disclosure herein discussed an improvement of communication between a UAV and a ground controller, it should be immediately recognized that the contemplated device can work equally as well to improve communication between UAVs in flight.

The contemplated housing 3 can be made of suitable materials to withstand temperature extreme and whether extremes, such materials include synthetic polymers, various metals and metal alloys, naturally occurring materials, textile fibers, and all reasonable combinations thereof.

Thus, specific embodiments and applications of Tail Tracking Antenna have been disclosed. It should be apparent, however, to those skilled in the art that many more modifications besides those already described are possible without departing from the disclosed concepts herein. The embodiment, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Insubstantial changes from the claimed subject matter as viewed by a person with ordinary skill in the art, now known or later devised, are expressly contemplated as being equivalent within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted and also what essentially incorporates the essential idea of the embodiment. In addition, where the specification and claims refer to at least one of something selected from the group consisting of A, B, C . . . and N, the text should be interpreted as requiring only one element from the group, not A plus N, or B plus N, etc.

What is claimed is:

1. An unmanned aerial vehicle, comprising:
a hinge, coupled to the unmanned aerial vehicle; and
a housing;
a flat panel antenna disposed within the housing and is pivotably coupled to the hinge to change a pitch of the flat panel antenna; and
wherein the flat panel antenna is freely pivotably coupled to the hinge and is actuated by a force of gravity.

2. The unmanned aerial vehicle of claim 1 further comprising an actuator to actively control the pitch the flat panel antenna.

3. The antenna device of claim 2, wherein the actuator is a servo motor.

4. The unmanned aerial vehicle of claim 1, further comprising a gap sufficiently spaced between the flat panel antenna and the housing to create an air resistance to dampen a free pivoting movement of the flat panel antenna by said force of gravity, and a size of the gap remains consistent as the panel antenna freely and hysteretically pivots by said force of gravity.

5. The unmanned aerial vehicle of claim 1, wherein the housing has a bottom wall, said bottom wall has an arcuate shape.

6. The unmanned aerial vehicle of claim 1, wherein the housing is airtight.

7. The antenna device of claim 1, wherein the housing comprises:
a first wall coupled to the hinge;
the first wall is arranged to stop the flat antenna on the first wall when the unmanned aerial vehicle tilts more than a first angle, wherein the first angle is at most 55 degrees to a vertical axis perpendicular to the hinge.

8. The antenna device of claim 7, wherein the housing further comprises:
a second wall coupled to the hinge;
the second wall is arranged to stop the flat antenna on the second wall when the unmanned aerial vehicle tilts more than a second angle, wherein the second angle is at most −55 degrees to a vertical axis perpendicular to the hinge.

9. A UAV (unmanned aerial vehicle) communication system, comprising:
a UAV having a top side, bottom side, and an antenna side;
a ground controller configured to send a positional information of the ground controller to the UAV causing the UAV to constantly remain facing the ground controller with the antenna side, regardless of a relative orientation of the UAV to the ground controller;
an antenna device coupled to the antenna side of the UAV, the antenna device comprising:
a hinge coupled to the unmanned aerial vehicle; and
a flat panel antenna pivotably coupled on the hinge.

10. The communication system of claim 9 further comprising an actuator to actively control a pitch the flat panel antenna, wherein the actuator is one selected from the group consisting of a servo motor, and a gimbal.

11. The communication system of claim 9, wherein the antenna device further comprises a housing to enclose the flat panel antenna, and the flat panel antenna pivots relative to the housing.

12. The communication system of claim 11, wherein the flat panel antenna is freely pivotably coupled to the hinge and is actuated by a force of gravity.

13. The communication system of claim 12 further comprising a gap sufficiently spaced between the flat panel antenna and the housing to create an air resistance to dampen a free pivoting movement of the flat panel antenna by said force of gravity, and a size of the gap remains consistent as the panel antenna freely and hysteretically pivots by said force of gravity.

14. The communication system of claim 12, wherein the housing has a bottom wall, said bottom wall has an arcuate shape.

15. The communication system of claim 12, wherein the housing comprises:
a first wall coupled to the hinge;
wherein the first wall is arranged to stop the flat antenna on the first wall when the unmanned aerial vehicle tilts more than a first angle, wherein the first angle is at most 55 degrees to a vertical axis perpendicular to the hinge.

16. The communication system of claim 15, wherein the housing further comprises:
a second wall coupled to the hinge;
wherein the second wall is arranged to stop the flat antenna on the second wall when the unmanned aerial vehicle tilts more than a second angle, wherein the second angle is at most −55 degrees to a vertical axis perpendicular to the hinge.

* * * * *